Feb. 18, 1969

F. X. CROWLEY 3,427,777

PROCESS OF MAKING DOMES

Filed Oct. 26, 1966

INVENTOR.
Francis X. Crowley
BY
Henway, Jenney & Hildreth

Feb. 18, 1969
F. X. CROWLEY
3,427,777
PROCESS OF MAKING DOMES
Filed Oct. 26, 1966
Sheet 2 of 3
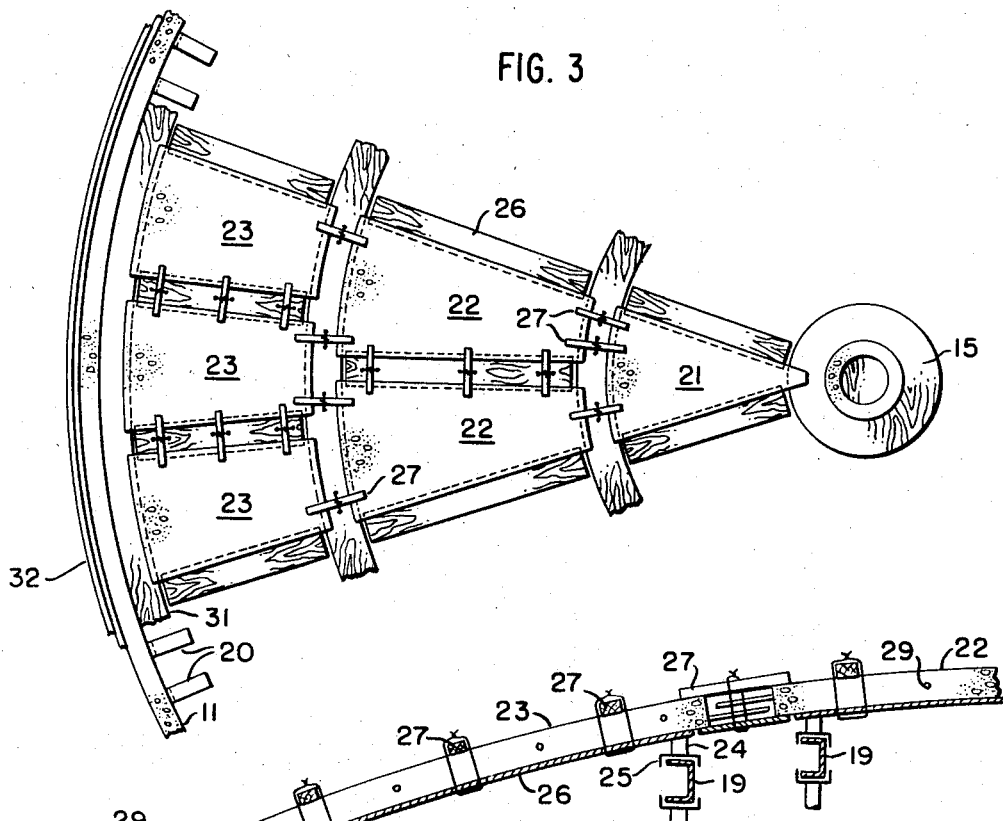
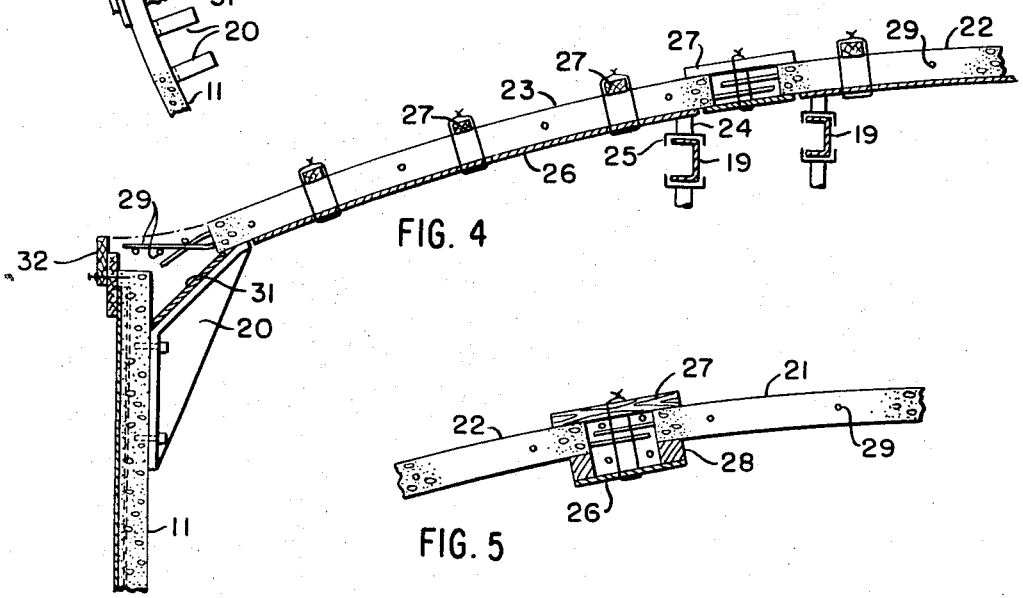
INVENTOR.
Francis X. Crowley Feb. 18, 1969  F. X. CROWLEY  3,427,777
PROCESS OF MAKING DOMES Filed Oct. 26, 1966  Sheet 3 of 3

INVENTOR.
Francis X Crowley
BY
Kenway, Jenney & Hildreth

United States Patent Office 3,427,777
Patented Feb. 18, 1969

3,427,777
PROCESS OF MAKING DOMES
Francis X. Crowley, Wellesley, Mass., assignor to Crowley Hession Engineers, Boston, Mass., a partnership composed of Francis X. Crowley and John Hession
Filed Oct. 26, 1966, Ser. No. 589,650
U.S. Cl. 52—744　　　　　　　　　　　　　　　4 Claims
Int. Cl. E04g 21/00, 11/36; E04b 7/08

ABSTRACT OF THE DISCLOSURE

Process of making concrete domes characterized by arranging a group of precast concrete segments in a defined area while providing peripheral spaces about each segment, closing the bottom of these spaces thus forming channels between the segments and filling the channels with concrete. The panels are formed on a casting bed having a curved mold surface, each panel acting as a molding bed for the one above it.

---

This invention comprises a new and improved process of making concrete domes for structures such as circular arenas or for storage tanks for water, oil, grain and other materials. The invention includes within its scope the novel dome herein shown as produced by the process.

Heretofore such structures have necessitated the fabrication of expensive wooden falsework forms beneath the dome as well as the costly steps of stripping and removing the forms. When concrete or gunite casting is required this work cannot be started until the falsework and forms are all in place. Moreover faulty concrete or gunite once embedded in a dome has been found difficult to remove and replace. Then, too, there has always been a difficult quality control problem since the concrete must be poured, shaped and finished high off the ground in inconvenient locations. Difficulties have also been encountered because of sluffing of concrete placed at a slope near the dome ring.

The process of my invention has important advantages in obviating or correcting these difficulties of former procedures. It may be carried out with the assistance of conventional and economic steel falsework that can be speedily erected within the structure, removed when it has served its purpose and reused many times.

The process is characterized by the steps of arranging a group of precast concrete segments in a defined circular area, supporting the segments at dome height from within the structure while providing peripheral spaces about each segment, closing the bottom of these spaces with sheet material and thus forming mold channels between the segments, filling the channels with concrete and releasing the dome segments from support when the concrete has set.

In carrying out the process of this invention much less false work is required than heretofore because the precast segments require support only at points rather than a continuous mold surface as is required when concrete is poured direct and molded in forming an integral dome. Crack distribution and control is simplified by convenient access to the individual solid segments during construction. Faulty concrete may be detected and replaced before the segments are lifted for placement in the dome.

The aggregate amount of concrete in the dome may be reduced by imparting to it a network of ribs that reduce the tendency to buckle and support shell sections of lesser thickness. A further advantage is that the dome segments may be precast on the ground in horizontal position from ready-mix trucks and only lifted to the dome level after inspection and as drawn from a reserve supply sufficient to insure completion of the dome.

These and other features of the invention will be best understood and appreciated from the following description of a preferred manner of carrying it out as suggested in the accompanying drawings in which—

Figure 1:
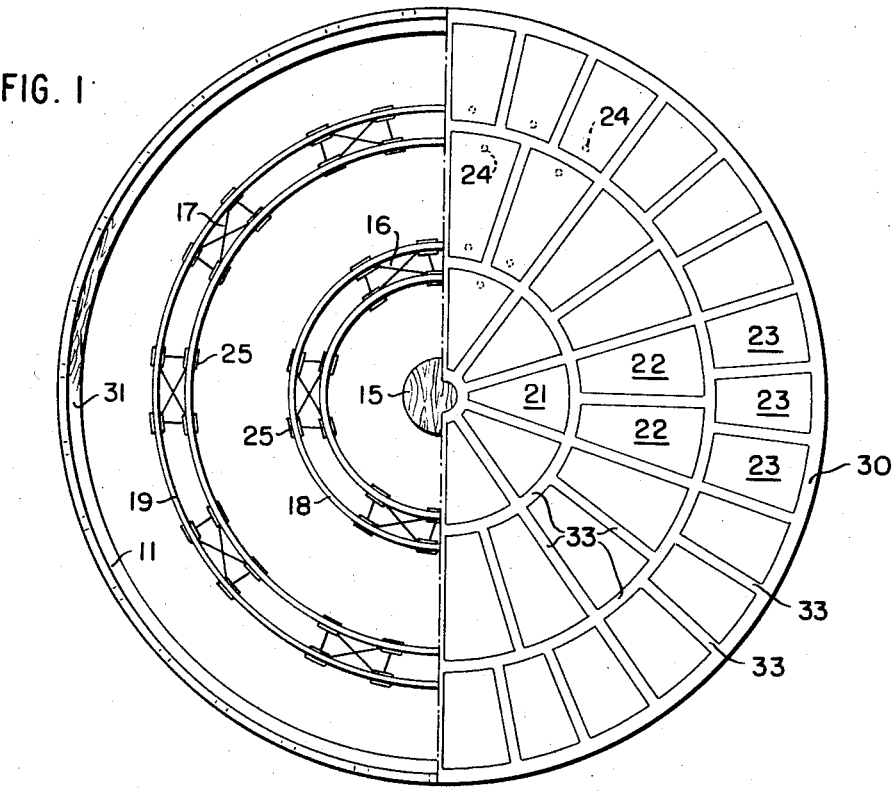
Figure 2:
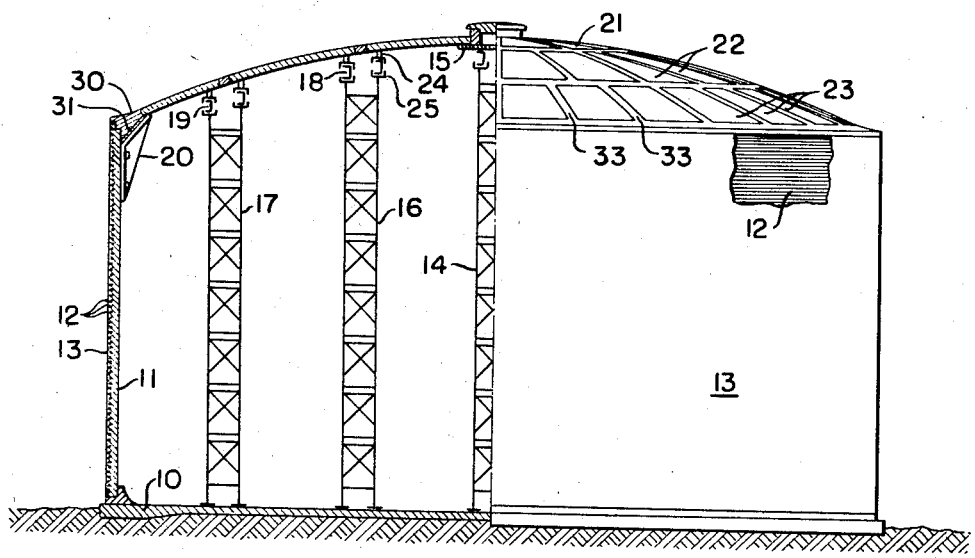
Figure 6:
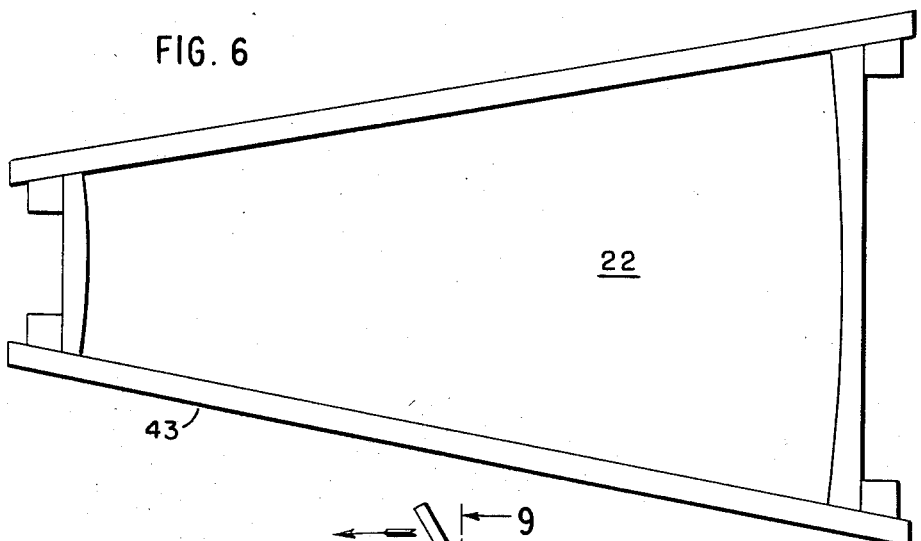
Figure 7:
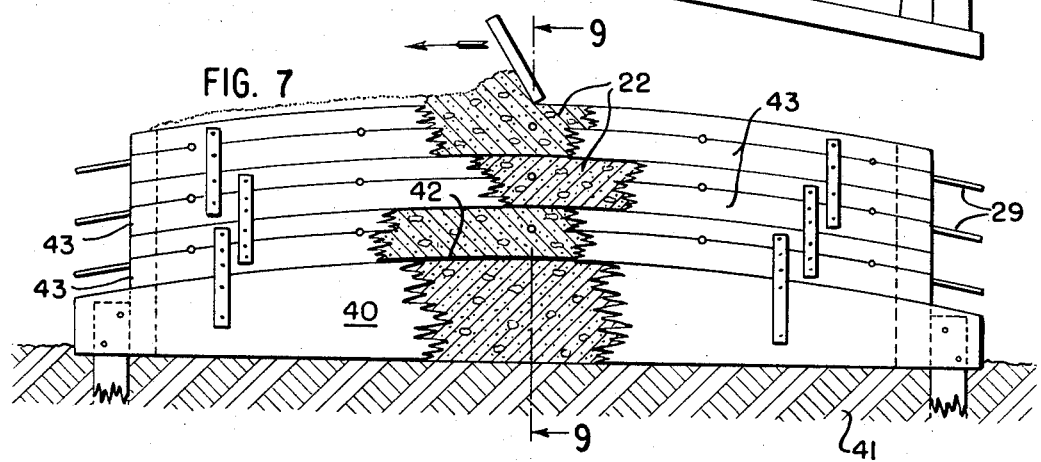
Figure 8:
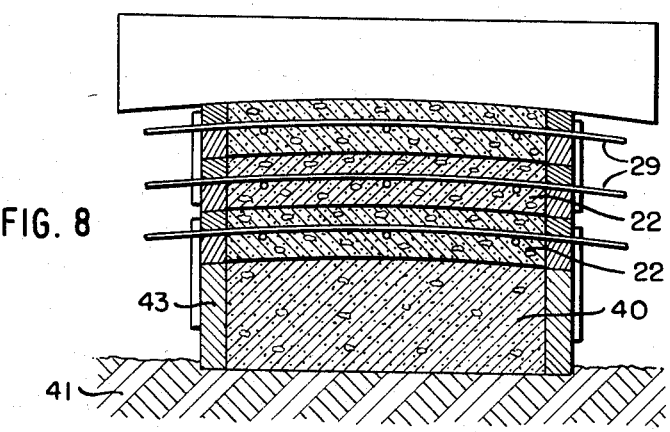

FIG. 1 is a plan view of the dome showing precast segments in position in half of its area, FIG. 2 is a corresponding view in elevation partly in section, FIG. 3 is a fragmentary sector of the dome on a somewhat larger scale, FIGS. 4 and 5 are fragmentary details of the dome, and FIGS. 6–8 suggest the steps of precasting individual dome segments.

The invention is shown herein in its application to a circular structure, such as a tank having a solid foundation 10 and an upright core wall 11 which may be formed of precast panels in accordance with my pending application Ser. No. 207,898 now Patent No. 3,280,525, or by any conventional system of tank construction. The wall is prestressed by wire 12 wound therein under high tension and protected by a cover wall or coating 13 as shown in FIG. 2.

Temporary posts, preferably of skeleton fabrication, are now erected within the tank walls, and of these a center post 14 carries a disk or ring 15 for supporting segments at the apex of the dome. Intermediate posts 16 and 17 are erected in circular pattern spaced to divide the tank area into three circular concentric sections or areas. The inner circle of posts 16 carries a circular channel beam 18 and the outer circle of posts 17 carries a circular channel beam 19.

Spaced knee brackets 20 are temporarily bolted to the upper inner surface of the wall 11 as shown in FIG. 4 and these supplement the circular beams 18 and 19 and the central disk 15 in supporting assembled segments of the dome.

The precast segments of the dome are so constructed and arranged as to make a circular pattern of the whole dome area. They comprise ten inner apex segments 21 approximately pie-shaped, twenty intermediate trapezoidal sections 22 and thirty outer segments 23, nearly rectangular in contour.

All segments are precast with enclosed reinforcing rods and in this particular dome would have a radius curvature of ninety feet or thereabout. Contact between the segments and the circular beams 18 and 19 is made by stubs 24 carried by sheet metal caps 25 that fit the circular beams 18 and 19 and may be adjusted thereon in accordance with the pattern of the segments and, if desired, to enter recesses provided for them in the under faces of the segments.

It will be apparent from FIGS. 1 and 2 that the segments are assembled with peripheral space between them forming a network of connected passages that may be 8 to 10 inches in depth. These passages are converted into connected peripheral channels or molds by securing plywood sheets 26 to the under surfaces of the segments. This may be conveniently done by suspending the sheets by wires from cross pieces or hangers 27 placed on the upper surface of the assembled segments.

It is desirable in some cases to convert the peripheral channels into molds for ribs of greater thickness than that of the segments. This is done by interposing spacers 28 between the under face of the adjacent segment and the plywood sheet as shown in FIG. 5. Thus a mold is built up for casting a rib that may be twice the thickness of the adjacent segments.

Having thus supported the entire assembly of segments and provided between them a connected network of peripheral channel molds, these molds are completely filled with concrete which is then allowed to set in the form of a complete network of connected ribs reinforced by rods projecting into the ribs from the adjacent dome segments as well as rods placed longitudinally in the channels.

At or approximately at the same pouring a dome ring 30 is formed which extends above and about the rim of the wall 11 for the important function of confining the outward thrust of the dome segments in the finished dome. In forming a mold for this ring strips of plywood 31 are placed or inserted upon the knee brackets 20 to form an inclined inner lower mold surface for the ring. At the same time an upstanding ring 32 of plywood strips is secured to outer ring surface of the wall 11 for forming the outer upright mold surface of the mold ring. The cross section of the mold ring is apparent in FIG. 4. Reinforcing rods 29 project into the body of the ring from the outer dome segment 23 and also lie circumferentially in it.

As soon as the concrete has set in the ribs and ring, the ring is placed under substantial prestressing by wire 12 wrapped under tension about it. This prestressing of the dome ring not only confines the radial thrust of the segments but tends to lift the dome bodily above the posts and all points of supporting contact with the stubs 24. The posts 14, 16 and 17 may now be dismantled and hoisted out through a space in the dome left for that purpose by omitting temporarily a segment of the dome pattern.

The process above outlined may be supplemented by a novel procedure for precasting the segments of the dome. As suggested in FIGS. 6, 7 and 8 a solid casting bed 40 of concrete is built up upon a foundation 41 and provided with a curved upper mold surface 42 for casting the trapezoidal dome segments 22. Accordingly, the bed 40 is surrounded by upstanding boundary boards or frames 43 forming a complete mold having the contour of the dome segments 22. The boards 43 are built up sectionally to permit the reinforcing rods 29 to be incorporated in the concrete as cast in the mold thus prepared. The upper surface of the segment 22 cast on the bed 40 is shaped to conform with the curved surface 42 of the casting bed.

As soon as the concrete of the first segment 22 has set, the boundary boards 43 are extended upwardly thus providing an overlying mold for a second segment 22 which takes its shape from the segment already completed. This procedure is repeated until a stack is built up containing the required number of dome segments. These are drawn from the stack as required for assembling in circular pattern of the dome. The segments 21 and 23 may be cast in the same type of stack formation as the segments 22.

Having thus disclosed my invention, and described in detail an illustrative example thereof, I claim as new and desire to secure by Letters Patent:

1. Process of making domes for circular structures, comprising the steps of arranging a group of precast concrete segments in a defined circular area, supporting the segments at dome height from within the structure while providing peripheral spaces about each segment, closing the bottoms of the said spaces by plywood sheets suspended from hangers placed on the upper surface of the assembled segments and thus forming mold channels between the segments, filling the channels with concrete, and releasing the dome segments from support when the concrete has set.

2. Process as described in claim 1 further characterized by the step of confining the concrete dome segments within the circumference of a prestressed dome ring which extends about the rim of the tank.

3. Process as described in claim 1, further characterized by the step of forming a bottom for said peripheral spaces that is spaced away from the inner and lower faces of the dome segments, and casting in the mold channels thus formed concrete ribs of greater thickness than the adjacent panels and projecting inwardly from the inner face of the dome.

4. Process as described in claim 1, preceded by the preliminary steps of forming a solid casting bed having a curved molding surface, surrounding the said bed with upstanding bounding walls, casting a curved concrete panel of substantially uniform thickness upon said bed within the confines of said bounding walls, casting a second curved panel upon the curved molding surface of the first panel as a bed, and continuing the process to form a stack of substantially identical curved concrete panels that may be separated from the stack one at a time as required for assembling in the area of the dome.

References Cited

UNITED STATES PATENTS

| | | | |
|---|---|---|---|
| 3,300,916 | 1/1967 | Pritzker | 52—246 X |
| 1,074,760 | 10/1913 | Vought | 52—324 |
| 1,330,370 | 2/1920 | Davis | 52—127 |
| 1,573,502 | 2/1926 | Peters | 264—171 |
| 1,878,367 | 9/1932 | Bemis | 52—745 |
| 2,223,418 | 12/1940 | Hewett | 52—81 |

FRANK L. ABBOTT, *Primary Examiner.*

S. D. BURKE, *Assistant Examiner.*

U.S. Cl. X.R.

52—80, 246, 323, 337, 743; 264—32, 274

UNITED STATES PATENT OFFICE

CERTIFICATE OF CORRECTION

Patent No. 3,427,777                                                  February 18, 1969

Francis X. Crowley

It is certified that error appears in the above identified patent and that said Letters Patent are hereby corrected as shown below:

Column 4, line 6, "plywood sheets" should read -- sheet material --.

Signed and sealed this 31st day of March 1970.

(SEAL)
Attest:

Edward M. Fletcher, Jr.                              WILLIAM E. SCHUYLER, JR.
Attesting Officer                                            Commissioner of Patents